March 4, 1969  G. EGGERS ET AL  3,430,858
JET POWER PLANT
Filed Aug. 8, 1966
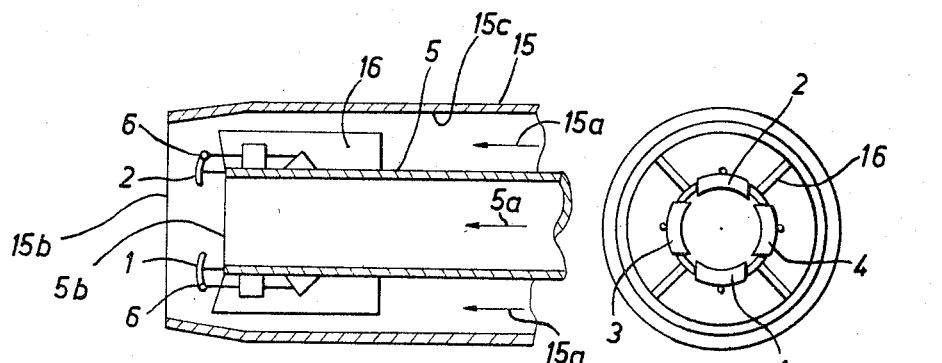
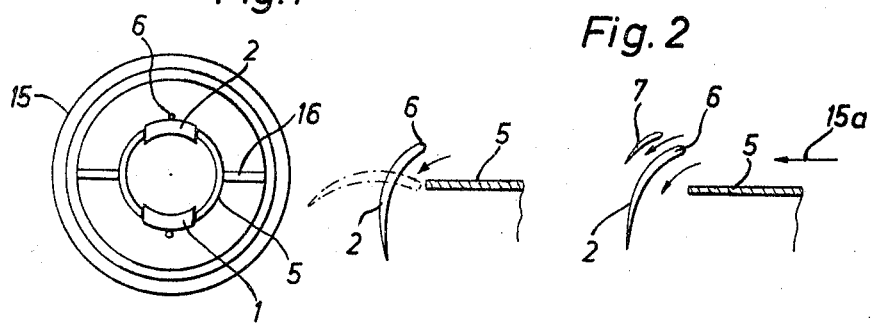
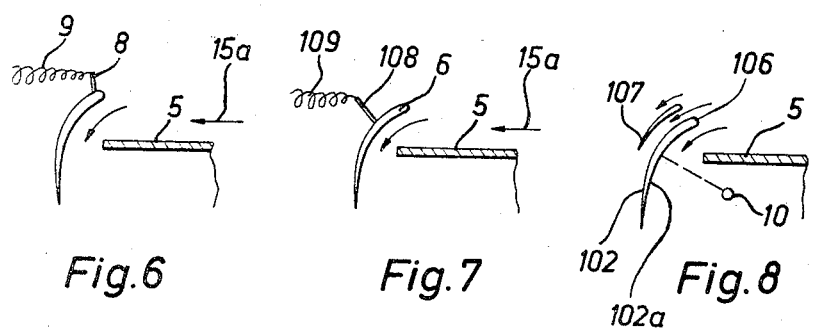
INVENTORS
Gerhard Eggers
Wilhelm Sebold
BY
Michael J. Striker
Atty United States Patent Office 3,430,858
Patented Mar. 4, 1969

3,430,858
JET POWER PLANT
Gerhard Eggers, Bremen, and Wilhelm Seibold, Aachen-Laurensberg, Germany, assignors to Vereinigte Flugtechnische Werke, GmbH., Bremen, Germany
Filed Aug. 8, 1966, Ser. No. 570,859
U.S. Cl. 239—127.3             12 Claims
Int. Cl. B64d 33/04; B64c 15/06

ABSTRACT OF THE DISCLOSURE

A jet power plant having an inner duct for ducting hot gases, an outer duct surrounding the inner duct, and defining therewith an annular passage for ducting cool gases, and a plurality of deflecting vanes movable between inoperative and deflecting positions for deflecting when in the latter position, cool gases from the annular passage into the stream of hot gases emanating from the outlet of the inner duct and in which each of the vanes has an upstream portion radially inwardly of the outer duct in the path of cool gases so that such cool gases will pass along opposite surfaces of said vanes to cool the latter when in the deflecting position.

---

The present invention relates to jet power plants in general, and more particularly to improvements in two-cycle jet power plants which may be utilized to propel aircraft and wherein an annular stream of relatively cool gases surrounds an inner stream of hot gases. Still more particularly, the invention relates to improvements in a deflecting system which may be utilized in such two-cycle power plants to deflect cool gases into the stream of hot gases.

It is an important object of the present invention to provide a deflecting system which is simpler, less expensive, more reliable and more efficient than the deflecting systems of presently known two-cycle jet power plants.

Another object of the invention is to provide a deflecting system whose vanes or analogous deflecting elements are automatically cooled when in actual use and wherein such deflecting elements need not consist of expensive material.

An additional object of the invention is to provide a two-cycle jet power plant wherein the action of reaction forces upon the deflecting elements of the deflecting system is balanced in a very simple and efficient way.

A further object of the invention is to provide a deflecting system whose components need not be machined with utmost precision and wherein such components are less likely to undergo undesirable deformation and/or to jam than the components of conventional deflecting systems for jet power plants.

A concomitant object of the invention is to provide a two-cycle jet power plant wherein the deflecting system which directs cool gases into the stream of hot gases may comprise a lesser or greater number of vanes or analogous deflecting elements.

Briefly stated, one feature of the present invention resides in the provision of a two-cycle jet power plant, particularly for aircraft, which comprises inner duct means for ducting hot gases and provided with an outlet from which the hot gases issue as a stream, outer duct means surrounding the inner duct means and defining therewith an annular passage for ducting cool gases concurrent with the hot gases in the inner duct means, and deflecting means for directing cool gases from the annular passage into the stream of hot gases. The deflecting means comprises a plurality of deflecting elements (hereinafter called vanes) supported by one of the duct means and movable between deflecting and inoperative or non-deflecting positions. Each such deflecting vane has a front portion which is located in the path of cool gases in the deflecting position of the respective deflecting vane.

Each deflecting vane may be provided with an auxiliary vane which is parallel thereto and is located downstream of the associated deflecting vane when the latter is rocked or otherwise moved to deflecting position.

The novel features which are considered as characteristic of the invention are set forth in particular in the appended claims. The improved jet power plant itself, however, both as to its construction and its mode of operation, together with additional features and advantages thereof, will be best understood upon perusal of the following detailed description of certain specific embodiments with reference to the accompanying drawings, in which:

FIG. 1 is a fragmentary axial section through a two-cycle jet power plant which embodies one form of the invention and whose deflecting means comprises four equidistant deflecting vanes;

FIG. 2 is an end elevational view of the jet power plant as seen from the left-hand side of FIG. 1;

FIG. 3 is an end elevational view of a modified jet power plant whose deflecting means comprises two mirror symmetrical deflecting vanes;

FIG. 4 is a larger-scale view of a detail of the structure shown in FIG. 1 and illustrates a deflecting vane in deflecting or operative position;

FIG. 5 is a similar view but showing a deflecting vane which is associated with an auxiliary vane;

FIG. 6 illustrates a deflecting vane which is provided with vortex forming means;

FIG. 7 illustrates a deflecting vane which is provided with modified vortex forming means; and FIG. 8 illustrates a deflecting vane which resembles a portion of a circle and is rockable about an axis which passes through the center of such circle.

Referring first to FIGS. 1 and 2, there is shown a two-cycle jet power plant comprising an inner duct 5 which conveys hot gases in the direction indicated by an arrow 5a and is provided with an outlet 5b from which the hot gases issue as a stream. A second or outer duct 15 of circular cross-sectional outline surrounds the inner duct 5 and defines therewith an annular passage 15c for cool gases which flow concurrent with hot gases as indicated by arrows 15a. The outlet 15b of the outer duct 15 is located downstream of the outlet 5a.

The deflecting means of this power plant comprises four equidistant deflecting vanes 1, 2, 3 and 4 each of which is supported externally by the inner duct 5 adjacent to the outlet 5b and each of which is movable from an inoperative or non-deflecting position to a deflecting position corresponding to the position of the vane 2 shown in FIG. 4. The vanes 1–4 are mounted on adjustable arms which form a motion transmitting linkage and are movable substantially radially of the inner duct 5. The means for moving the vanes comprises servomotors carried by the duct 5 and operable by remote control. When moved to deflecting position, the outer or front portion 6 of each deflecting vane is located in the path of cool gases and such cool gases are then deflected into the stream of hot gases issuing from the outlet 5b. The numerals 16 denote in FIGS. 1 and 2 distancing members which center the inner duct 5 in the outer duct 15.

The jet power plant of FIG. 3 comprises only two mirror symmetrical vanes 1 and 2.

FIG. 5 shows that each deflecting vane (only the vane 2 is shown) may be associated with an auxiliary vane 7 which is parallel thereto and is located downstream of the respective deflecting vane as seen in the direction of the arrow 15a. The vane 7 may be connected to and is then movable with the vane 2.

FIGS. 6 and 7 illustrate two forms of vortex forming means 8, 108 which serve to intercept the reaction forces at the downstream (convex) sides of the deflecting vanes. The means 8, 108 extend transversely of the direction of cool gas flow (arrows 15a) and each such means forms a strong vortex or wake as indicated at 9 and 109.

Referring finally to FIG. 8, there is shown a deflecting vane 102 which resembles a portion of a circle and is rockable about a pivot axis 10 which passes through the center of such circle. In other words, the center of curvature of the concave inner side 102a which faces the oncoming cool gases is located on the pivot axis 10. This pivot axis is disposed within the confines of the inner duct 5. The vane 102 is associated with an auxiliary vane 107. The arrangement of FIG. 8 can also counteract the reaction force.

A very important advantage of the improved jet power plant is seen to reside in that the effect of the deflecting vanes is much more satisfactory than in presently known two-cycle jet power plants. This is attributed to the fact that the front portions 6, 106 of the deflecting vanes are located in the path of cool gases when such vanes deflect some or all of the cool gases into the stream of hot gases issuing from the inner duct 5. The deflecting action of the deflecting vanes is further enhanced by the provision of auxiliary vanes 7 or 107.

Another important advantage of the jet power plant is that the deflecting and auxiliary vanes are less likely to undergo excessive deformation in response to heating by hot gases. Such deformation could lead to jamming of the adjusting means. Also, the vanes and the adjusting and actuating means therefor need not be finished with utmost precision, and such parts need not be manufactured of expensive highly heat-resistant material. Greater tolerances in machining facilitate the installation of vanes and other components in the power plant. All this is attributable to the fact that the vanes are properly cooled by cool gases flowing in the outer duct 15.

Without further analysis, the foregoing will so fully reveal the gist of the present invention that others can, by applying current knowledge, readily adapt it for various applications without omitting features which fairly constitute essential characteristics of the generic and specific aspects of the above described contribution to the art and, therefore, such adaptations should and are intended to be comprehended within the meaning and range of equivalence of the following claims.

What is claimed as new and desired to be protected by Letters Patent is:

1. In a jet power plant, inner duct means for ducting hot gases and having an outlet from which such hot gases issue as a stream; outer duct means surrounding said inner duct means and defining therewith an annular passage for ducting cool gases concurrent with the hot gases in said inner duct means; and deflecting means for deflecting cool gases from said passage into said stream, said deflecting means comprising a plurality of deflecting vanes supported by one of said duct means and movable between inoperative and deflecting positions for deflecting in the latter position cool gases into the stream of hot gases, each of said deflecting vanes having an upstream portion radially inwardly of said outer duct means in the path of cool gases so that such cool gases will pass along opposite faces of said vanes to cool the latter when in said deflecting position.

2. A structure as set forth in claim 1, wherein each of said deflecting vanes has in said deflecting position a downstream portion located in said stream of hot gases passing through said inner duct means and having an inner edge spaced from the axis of said inner duct means.

3. A structure as set forth in claim 1, wherein said outer duct means extends uninterrupted beyond the outlet of said inner duct means.

4. A structure as set forth in claim 1, further comprising an auxiliary vane for each of said deflecting vanes, each of said auxiliary vanes being parallel with and being located downstream of the respective deflecting vane when the latter assumes said deflecting position.

5. A structure as set forth in claim 1, wherein each of said deflecting vanes comprises vortex forming means extending outwardly from said vane substantially transversely of the direction in which the cool air flows in the inoperative position of the respective deflecting vane.

6. A structure as set forth in claim 1, wherein each of said deflecting vanes resembles a portion of a circle and has a concave side facing the oncoming cool gases in said deflecting position thereof, each of said deflecting vanes being rockable about a pivot axis which passes through the center of curvature of the respective concave side.

7. A structure as set forth in claim 6, wherein said centers of curvature are located within the confines of said inner duct means.

8. A structure as set forth in claim 1, wherein said outer duct means is provided with an outlet located downstream of said first mentioned outlet and wherein said deflecting vanes are mounted on said inner duct means, each of said deflecting vanes comprising a second portion located downstream of said first mentioned outlet and extending into said stream when the respective vane assumes said deflecting position.

9. A structure as set forth in claim 1, wherein said deflecting vanes are movable substantially radially of said inner duct means.

10. A structure as set forth in claim 1, wherein said deflecting means comprises two mirror symmetrical deflecting vanes.

11. A structure as set forth in claim 1, wherein said deflecting means comprises more than two equidistant deflecting vanes.

12. A structure as set forth in claim 1, wherein said outer duct means is coaxial with said inner duct means and wherein said deflecting vanes are mounted externally on said inner duct means.

References Cited
UNITED STATES PATENTS

| | | | |
|---|---|---|---|
| 2,722,801 | 11/1955 | Lombard | 239—127.3 |
| 2,931,169 | 4/1960 | Glenn | 239—127.3 |
| 2,969,641 | 1/1961 | Schaefer | 239—127.3 |
| 3,302,889 | 2/1967 | Di Sabato | 239—265.39 |

STANLEY H. TOLLBERG, *Primary Examiner.*

U.S. Cl. X.R.

239—265.39